US012116551B2

(12) United States Patent
Matza

(10) Patent No.: US 12,116,551 B2
(45) Date of Patent: Oct. 15, 2024

(54) SOLVENT COMPOSITION AND PROCESS FOR CLEANING CONTAMINATED INDUSTRIAL EQUIPMENT

(71) Applicant: United Laboratories International, LLC, Houston, TX (US)

(72) Inventor: Stephen D. Matza, Sugarland, TX (US)

(73) Assignee: UNITED LABORATORIES INTERNATIONAL, LLC, Houston, TX (US)

( * ) Notice: Subject to any disclaimer, the term of this patent is extended or adjusted under 35 U.S.C. 154(b) by 0 days.

(21) Appl. No.: 17/944,082

(22) Filed: Sep. 13, 2022

(65) Prior Publication Data

US 2023/0021671 A1 Jan. 26, 2023

Related U.S. Application Data

(63) Continuation of application No. 15/407,137, filed on Jan. 16, 2017, now Pat. No. 11,441,103.

(51) Int. Cl.

| | |
|---|---|
| ***C11D 3/00*** | (2006.01) |
| ***B08B 3/00*** | (2006.01) |
| ***B08B 3/08*** | (2006.01) |
| ***B08B 3/10*** | (2006.01) |
| ***B08B 9/08*** | (2006.01) |
| ***C11D 1/75*** | (2006.01) |
| ***C11D 3/37*** | (2006.01) |
| ***C11D 3/386*** | (2006.01) |

(52) U.S. Cl.

CPC .............. *C11D 3/0026* (2013.01); *B08B 3/00* (2013.01); *B08B 3/08* (2013.01); *B08B 3/10* (2013.01); *B08B 9/08* (2013.01); *C11D 1/75* (2013.01); *C11D 3/373* (2013.01); *C11D 3/386* (2013.01); *C11D 2111/20* (2024.01)

(58) Field of Classification Search

None

See application file for complete search history.

(56) References Cited

U.S. PATENT DOCUMENTS

| | | | |
|---|---|---|---|
| 1,666,015 A * | 4/1928 | Land | B08B 9/093 134/102.1 |
| 2,944,924 A | 7/1960 | Sven-Erik et al. | |
| 4,238,892 A | 12/1980 | Geiss | |
| 5,342,450 A | 8/1994 | Cockrell, Jr. et al. | |
| 5,419,145 A | 5/1995 | Chandler et al. | |
| 5,459,066 A | 10/1995 | Mestetsky | |
| 5,462,607 A | 10/1995 | Mestetsky et al. | |
| 5,642,743 A | 7/1997 | Ranes | |
| 5,660,732 A | 8/1997 | Mestetsky | |
| 5,686,297 A | 11/1997 | Mestetsky | |
| 5,691,291 A | 11/1997 | Wierenga et al. | |
| 5,980,733 A | 11/1999 | Collins et al. | |
| 6,770,150 B1 | 8/2004 | Duckett et al. | |
| 8,617,317 B1 | 12/2013 | Levitt | |
| 9,206,380 B2 | 12/2015 | Erickson et al. | |
| 9,260,679 B2 | 2/2016 | Craft | |
| 2002/0194681 A1 | 12/2002 | DeYoung et al. | |
| 2007/0283508 A1 | 12/2007 | Wong et al. | |
| 2011/0019019 A1 | 1/2011 | Liu | |
| 2011/0190190 A1 | 8/2011 | Schubert et al. | |
| 2014/0023609 A1 | 1/2014 | Mukherjee et al. | |
| 2014/0261546 A1 | 9/2014 | Erickson et al. | |
| 2015/0132833 A1* | 5/2015 | Chan | C11D 3/3723 510/392 |
| 2017/0066997 A1 | 3/2017 | Chen et al. | |

FOREIGN PATENT DOCUMENTS

| | | |
|---|---|---|
| CL | 2018003898 | 3/2019 |
| CN | 106590960 | 4/2017 |
| EP | 3091066 | 11/2016 |
| JP | 2008094881 | 4/2008 |
| JP | 2008094881 A | 4/2008 |
| RU | 2560169 | 8/2015 |
| WO | 2018005847 | 1/2018 |

OTHER PUBLICATIONS

Korean Examination Report and English Translation for Application No. 10-2019-7024068 dated Sep. 5, 2022.
Flare Drum Case Study by Refined Technologies Inc. Copyright 2017.
Decontamination by Ossama Ahmed Zainy Co. ozest.com Copyright 2013.
Vapor Phase Decontamination by Hydrocarbon Decontamination Specialist-TerraChem Copyright 2005.
"Understanding Oil and Grease" by Environmental Express dated Nov. 28, 2012.
"Types of Steam" by TVL dated Feb. 1, 2016.
International Search Report and Written Opinion for Application No. PCT/US2018/013803 dated May 15, 2018.
Singapore Search Report and Written Opinion for Application No. 11201907446S dated Jul. 6, 2020.
"Understanding Foaming consequence in Amine System" by Pronab Mistry dated Nov. 26, 2016.
Chilean Search Report and English Translation for Application No. 201901992 dated Aug. 6, 2020.
"Understanding Oil and Grease/Hexane Extractable Material (O&G or HEM)" by David Smith, Environmental Express, Inc., Lab Matters, (2012); vol. 12, No. 5 dated Nov. 28, 2012. URL: https://www.envexp.com/labmatters/208-oil-and-grease.
Kazakhstan Search Report and English Translation for Application No. 20190593.1 dated Jan. 16, 2018.
Philippines Examination Report for Application No. 1/2019/501891 dated Aug. 14, 2019.
Extended European Search Report for Application No. EP18738993 dated Sep. 28, 2020.
USPTO Non-Final Office Action for U.S. Appl. No. 15/407,137 dated Mar. 1, 2021.
Indian Examination Report for Application No. 201947032943 dated Mar. 24, 2021.
Russia Office Action and English Translation for Application No. 2019125843 dated Jul. 8, 2021.

(Continued)

*Primary Examiner* — Eric W Golightly
*Assistant Examiner* — Arlyn I Rivera-Cordero
(74) *Attorney, Agent, or Firm* — CONLEY ROSE, P.C.

(57) ABSTRACT

A method, system and composition for decontaminating a vessel. In an embodiment, a solvent composition for decontamination includes an amine oxide, polydimethylsiloxane, and water.

20 Claims, No Drawings

(56) References Cited

OTHER PUBLICATIONS

Colombian Office Action and English Translation for Application No. NC2019/0008919 dated Sep. 6, 2021.
Russian Office Action and English Translation for Application No. 2019125843/04(050691) dated Oct. 25, 2021.
USPTO Non-Final Office Action for U.S. Appl. No. 15/407,137 dated Dec. 27, 2018.
USPTO Final Office Action for U.S. Appl. No. 15/407,137 dated Oct. 2, 2019.
USPTO Non-Final Office Action for U.S. Appl. No. 15/407,137 dated Apr. 28, 2020.
USPTO Final Office Action for U.S. Appl. No. 15/407,137 dated Nov. 9, 2020.
USPTO Non-Final Office Action for U.S. Appl. No. 15/407,137 dated Nov. 8, 2021.
USPTO Notice of Allowance for Application No. 15/407, 137 dated May 6, 2022.
USPTO Issue Notification for U.S. Appl. No. 15/407,137 dated Aug. 24, 2022.
UAE Search Report for Application No. P6001021/2019 dated Sep. 27, 2023.
UAE Examination Report for Application No. P6001021/2019 dated Sep. 27, 2023.

* cited by examiner

SOLVENT COMPOSITION AND PROCESS FOR CLEANING CONTAMINATED INDUSTRIAL EQUIPMENT

CROSS-REFERENCE TO RELATED APPLICATIONS

This application is a continuation of U.S. application Ser. No. 15/407,137 filed on Jan. 16, 2017, the disclosure of which is incorporated herein by reference.

STATEMENT REGARDING FEDERALLY SPONSORED RESEARCH OR DEVELOPMENT

Not applicable.

BACKGROUND OF THE INVENTION

Field of the Invention

This invention relates to the field of industrial facility cleanup and more specifically to the disaggregation and subsequent removal of residual oil, hydrogen sulfide, combustible gas, pyrophoric iron sulfides, and other contaminant materials from industrial equipment.

BACKGROUND OF THE INVENTION

During the refinement process of crude oil and natural gas, contaminant materials such as residual oils, hydrogen sulfide, pyrophoric compounds, and the like may be produced as byproducts. These contaminant materials may contaminate vessels, tanks, or other types of industrial equipment. The contamination of industrial equipment may lead to problems such as increased downtime, poor processing results, and safety hazards associated with toxic and pyrophoric compounds.

Numerous approaches to cleaning and decontaminating industrial equipment have been developed. In some refineries, simple steaming out of units may be performed to remove contaminants. Steaming alone may be an incomplete approach as steam may not remove pyrophoric iron sulfides nor may it neutralize hydrogen sulfide. Steaming out may be a generally slow process that typically may require a unit to be shut down for an extended period of time. Additionally, the excess temperature associated with the steam for decontamination may carbonize hydrocarbons present in equipment resulting in tougher deposits than were originally present. The tough hydrocarbon deposits may be removed by mechanical action that may result in longer downtimes or equipment damage.

Other approaches have been developed that use chemicals such as citrus-derived water products, water-based products, low boiling petroleum fractions (e.g., naphtha, gasoline, benzene, etc.), strong oxidizers, turpentine, as well as physical approaches such as freezing and scraping, which have all been used to remove contaminant materials with varying degrees of success. Decontamination products comprising solvents such as d-limonene or terpenes are often used with strong emulsifiers such as anionic emulsifiers or nonionic emulsifiers to achieve deoiling. Decontamination or cleaning of equipment using solvent products has generally been accomplished though circulating the solvent in liquid form or introducing the solvent by injection in steam to transport into equipment. In the case of a distillation column, the liquid may be injected throughout the column by steam using a plurality of injection points. The decontamination product may be collected in a mix tank or other vessel so the emulsions can be treated prior to routing the waste to a treatment facility.

Previous industrial decontamination technologies may include a multi-step process for removal of contaminants due to the large exothermic reaction associated with traditional oxidizers during the sulfide neutralization and other reactions. Typically, a cycle of deoiling and/or degassing may be performed and then a cycle of oxidation may be performed. The separate steps ensure that the safety risk of high heat combined with flammable contaminants may be minimized.

Such conventional approaches may have various drawbacks. For instance, citrus-derived water products may form emulsions even without the strong emulsifiers and thus may use emulsion breakers to break. Water-based products may require extensive separation effort if any of the hydrocarbons are to be recovered for recycling processes. Additionally, some water-based products may also require a solvent pretreatment to initiate the dissolution of the contaminant materials. Petroleum fractions may be highly flammable and also not easily rinseable with water. Freezing and scraping methods may require additional workers and may only be used in vessels that are accessible to and are safe for those workers. Finally, many of these same approaches are not biodegradable. The lack of biodegradability limits not only the applications for which an approach may be used, but also the operation sites in which it may be used.

Consequently, there is a need for a new solvent composition and process for the removal of contaminant materials.

BRIEF SUMMARY OF SOME OF THE PREFERRED EMBODIMENTS

These and other needs in the art are addressed in an embodiment by a solvent composition comprising an amine oxide, polydimethylsiloxane, and water.

These and other needs in the art addressed in other embodiments by a method of decontaminating a vessel, comprising providing a solvent composition comprising an amine oxide, polydimethylsiloxane, and water. The method also includes introducing the solvent composition into the vessel. The method further includes allowing the solvent composition to contact at least a portion of contaminants present in the vessel. In addition, the method includes discharging the solvent composition from the vessel.

These and other needs in the art are addressed in further embodiments by a system for decontaminating a vessel, comprising a solvent composition comprising an amine oxide, polydimethylsiloxane, and water. The system also includes a steam line. In addition, the system includes an introduction of the solvent composition into the steam line.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION OF THE PREFERRED EMBODIMENTS

In embodiments, a solvent composition may comprise a mixture of water, surfactants, anti-foaming agents, and enzymes. Without limitation, the solvent composition may disaggregate and/or dissolve contaminant materials from industrial equipment in industrial facilities (e.g., oil refineries, natural gas processing plants, petrochemical facilities, port terminals, and the like). In embodiments, the solvent composition may be used to remove a contaminant material from any industrial equipment or vessel used in industrial facilities including vessels, tanks, vacuum towers, heat exchangers, piping, distillation columns, and the like. Further, without limitation, the solvent composition may remove a sufficient amount of contaminant material from the industrial equipment or vessel to allow manned entry in a safe manner. In embodiments, contaminant materials to be removed may include any contaminant material produced, stored, transported, or the like during the process of crude oil refinement, natural gas processing, hydrocarbon transport, hydrocarbon processing, hydrocarbon cleanup, and the like. In embodiments, examples of contaminant materials may include residual oil, hydrogen sulfide, combustible gas, and pyrophoric iron sulfides, the like, or any combinations thereof. In embodiments, the contaminant materials are contacted with the solvent composition, such that the contaminant materials are disaggregated and/or dissolved and may then be subsequently removed from the industrial equipment. The contaminant materials may be oxidized in the process and reduced to a harmless form.

As previously discussed, attempts at formulating an industrial decontamination solution have generally used multiple steps to ensure the contaminants are removed safely. The solvent composition described herein may not include the separate steps of deoiling and oxidation as the oxidizer may be relatively mild compared to traditional oxidizers. A mild oxidizer may not have a large exothermic reaction and subsequent increase in temperature. Without limitation, due to the lower energy of the oxidation process, an industrial decontamination job using the solvent composition may perform all steps of a decontamination cycle simultaneously and safely with one chemical application.

In an embodiment, a contaminant removal process involves the solvent composition in a single step process involving one chemical formulation that is the solvent composition. The contaminant removal process comprising the solvent composition may remove contaminants of different elements of decontamination in the single step process, which elements include deoiling, degassing, pyrophoric neutralization, removal of toxic components, or any combinations thereof. In embodiments, without limitation, the contaminant removal process does not include deoiling/degassing, pyrophoric neutralization, and sulfide oxidation as separate and sequential steps, as, without limitation, a large exotherm that causes a safety risk is not present. For instance, in an embodiment, the tertiary amine oxide is a mild oxidizer that allows the contaminant removal process to be a quick and efficient process with substantially all of the steps of decontamination carried out about simultaneously and safely with one application. In embodiments, the solvent composition does not include any hydrocarbon solvents. In an embodiment, the contaminant removal process does not transport the solvent composition as a liquid dispersed in steam (e.g., steam dispersion), but rather comprises substantially total vaporization of the solvent composition, which allows the amine oxide to be transported through contaminated equipment or a vessel as a true vapor.

Embodiments of the solvent composition may comprise water. The water used in the solvent compositions may include, for example, freshwater or saltwater (e.g., water containing one or more salts or ions thereof). The water may be from any source. In embodiments, the water does not contain an excess of compounds that may undesirably affect other components in the solvent composition. Those of ordinary skill in the art, with the benefit of this disclosure, should be able to select an appropriate source and type of water for a particular application.

Embodiments of the solvent composition may include a surfactant comprising a cationic surfactant such as an amine oxide. Suitable amine oxides may generally follow Formula 1 as shown below. Formula 1 illustrates a tertiary amine oxide but one of ordinary skill would understand that primary and secondary amine oxides may also be used. The structure of the amine oxide may comprise a plurality of —$CH_2$— groups, with the number being denoted by the letter "n" in Formula 1. Embodiments of the amine oxide may comprise between 5 and 22 —$CH_2$— groups. For example, n may be about 5 to about 22, alternatively about 6 to about 20, alternatively about 8 to about 20, further alternatively about 10 to about 18, or alternatively about 12 to about 16. A solvent composition may comprise several amine oxides with various numbers of —$CH_2$— groups. Embodiments of the solvent composition may comprise one, two, three, or more different amine oxides. Examples of suitable amine oxides include N,N dimethyl decylamine; N,N dimethyl dodecylamine; N,N dimethyl tetradecylamine; N,N dimethyl hexadecylamine; N,N dimethyl octadecylamine, or any combinations thereof. Selecting one or more amine oxides may aid in contaminant removal as some contaminants may be more reactive with shorter chain amine oxides and some may be more reactive with longer chain amine oxides.

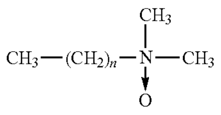

[1]

An amine oxide may act as a surfactant and lower the surface tension between vapor and liquids so that gas (e.g. combustible gas) may be more readily liberated and removed from equipment such as by a refinery steam. Gas may be sufficiently entrained or dissolved in liquids to where they would not normally escape without a reduction in surface tension. The liquids that gas may be entrained or dissolved in may be any liquids present in process equipment. In general, the liquids in a refinery or chemical plant may be hydrocarbon liquids such as oils, other semi-solid hydrocarbons such as bitumen or petroleum gels, or combinations thereof. The gas may be any gas, such as, without limitation, hydrocarbon gas and other combustible gas that is present in an amount above the lower explosive limit (LEL). A combustible gas present above the LEL may spontaneously ignite if exposed to an elevated temperature. It is to be understood that an amine oxide may aid in liberating at least a portion of the gas entrained in liquids.

Amine oxides may also act as an emulsifier and/or a wetting agent. For instance, the amine oxides may lower the surface tension between phases such as oil-water or water-vapor. Without limitation, such action by the amine oxide may facilitate the ability to include small droplets of oil to disperse in water for a short term while agitation occurs forming a temporary oil-in-water emulsion, which may quickly break when the agitation ceases. The amine oxides present in the solvent composition may emulsify oils and other hydrocarbons present in equipment. The oils may be emulsified and suspended in the bulk aqueous phase of the solvent composition. Once emulsified, oils may travel with the bulk phase and be transported out of the process equipment. One potential advantage of using an amine oxide may be that emulsions that are formed are loosely-held. A loosely-held emulsion refers to an emulsion that may not require a de-emulsifier to break (i.e., no emulsion breakers may be present). A loosely-held emulsion may break relatively easy as the micelles formed in the emulsion may quickly coalesce once agitation is ceased. As previously mentioned, other attempts at formulating a solvent composition for process equipment contaminant removal generally use a holding tank where a strong de-emulsifier may be added to break the emulsion formed. In embodiments, the solvent composition of the present disclosure may self-break without the need for a strong de-emulsifier, thereby potentially reducing equipment, chemicals, and time needed to decontaminate equipment.

In addition to liberating gasses from contaminated equipment and emulsifying oils, an amine oxide may also convert hydrogen sulfide to less harmful or harmless forms of sulfur and neutralize pyrophoric iron sulfides. An amine oxide may be a sufficient oxidizer to convert hydrogen sulfide to elemental sulfur and thiosulfate. Elemental sulfur is insoluble in water and may fall out of solution when agitation is ceased. Thiosulfate is highly soluble in water and may be carried out of the equipment by the bulk movement of solvent composition. Furthermore, the amine oxide may oxidize pyrophoric iron sulfides though surface oxidation. Products of oxidation of iron sulfides may include iron oxide and elemental sulfur. Amine oxides present in the solvent composition may remove essentially all hydrogen sulfide and iron sulfide and prevent regeneration of the contaminants by removing the sulfur from equipment. Although only iron sulfide is discussed herein, it should be understood that amine oxides may remove other metal sulfides in addition to iron sulfide.

The solvent composition may have any wt. % of amine oxide suitable for disaggregating, dissolving, emulsifying and/or oxidizing contaminant materials such that at least a portion of a contaminant material may be removed from the industrial equipment. In embodiments, the solvent composition has a concentration of amine oxide from about 240 ppm to about 2,400 ppm, alternatively from about 600 ppm to about 1,800 ppm. For instance, the contaminant material may be removed from the surface of industrial equipment in the case of hydrocarbon oils and deposits or neutralized at the surface in the case of iron sulfides. In an embodiment, the solvent composition may comprise about 30 to about 2,100 ppm amine oxide in water. Alternatively, the solvent composition may comprise between about 30 to about 500 ppm amine oxide in water, about 500 to about 1,250 ppm amine oxide in water, about 500 ppm to about 1,500 ppm amine oxide in water, or about 1,500 ppm to about 2,100 ppm amine oxide in water. With the benefit of this disclosure, one of ordinary skill in the art should be able to select an appropriate type of amine oxide and appropriate concentration for a chosen application.

Embodiments of the solvent composition may comprise polydimethylsiloxane. Polydimethylsiloxane is a silicon-based organic polymer that may act as an anti-foaming agent. In relatively higher concentrations, an amine oxide may cause foaming of the solvent composition, which may lead to poor performance. Excessive foaming may prevent components of the solvent composition from reaching the surface of equipment leading to poor cleaning. Polydimethylsiloxane may limit the extent of foaming and allow a higher concentration of amine oxide to be used. In particular, amine oxide may be used in concentrations as high at 2,400 ppm or higher with sufficient polydimethylsiloxane. As previously discussed, an amine oxide may form an emulsion with oil present in contaminated equipment. Air and other gasses may become entrapped in the emulsion or in any liquid or condensate present in equipment. Polydimethylsiloxane may destabilize air and other gas molecules that are trapped, allowing the gas to escape from the liquids. Destabilizing the gas may increase the overall gas liberation, which may improve the efficiency of gas removal. Polydimethylsiloxane and the amine oxide may synergistically work together to liberate substantially all gas present in oil or other hydrocarbon deposits in contaminated process equipment. Synergistically working together refers to the benefit derived from polydimethylsiloxane in limiting the amount of foam that is normally associated with cleaning such as with using Zyme-Flow® by itself and which foaming hinders the ability to expel gases during steam cleaning such as via Vapour-Phase® or boilout. Zyme-Flow® and Vapour-Phase® are registered trademarks of United Laboratories International, LLC.

Polydimethylsiloxane may have an average molecular weight range from about 6,800 to about 30,000 depending on the degree of polymerization. The degree of polymerization may affect other physical properties such as viscosity and vaporization temperature. In embodiments, vaporization temperature may affect the kind of steam used for decontamination. The solvent composition may have any weight percent of polydimethylsiloxane suitable for defoaming and destabilizing trapped gas. In an embodiment, the solvent composition may comprise about 1 to about 100 ppm polydimethylsiloxane in water. Alternatively, the solvent composition may comprise about 1 to about 10 ppm polydimethylsiloxane in water, or about 10 to about 30 ppm polydimethylsiloxane in water, or about 30 to about 50 ppm polydimethylsiloxane in water, or about 50 to about 70 ppm polydimethylsiloxane in water, or about 70 to about 100 ppm polydimethylsiloxane in water. With the benefit of this disclosure, one of ordinary skill in the art should be able to select an appropriate molecular weight range of polydimethylsiloxane and appropriate concentration for a chosen application.

The solvent compositions of the present disclosure may comprise enzymes. Enzymes may break down targeted materials. Enzymes may include natural enzymes. Some suitable enzymes for use in decontamination may include lipase which breaks down oils, cellulase which breaks down cellulosic materials, amylase which breaks down starches, proteases which break down protein, pectinases which break down plant materials, or any combinations thereof. The enzymes may be used alone of in any combination or blend to exhibit a desired result. In embodiments, enzymes may be used at any temperature below the denaturation temperature. In some embodiments, the temperatures are about 50° C. or below. In an embodiment, the enzymes may facilitate removal of oil and other contaminant materials when used in a solvent application. Enzymes may be of particular interest in low temperature applications and in liquid circulation applications. In an embodiment, the solvent composition may comprise about 1 to about 100 ppm total enzymes in water. Alternatively, the solvent composition may comprise about 1 to about 10 ppm total enzymes in water, or about 10 to about 30 ppm total enzymes in water, or about 30 to about 50 ppm total enzymes in water, or about 50 to about 70 ppm total enzymes in water, or about 70 to about 100 ppm total enzymes in water. With the benefit of this disclosure, one of ordinary skill in the art should be able to select an appropriate combination of enzymes and appropriate concentration for a chosen application.

In embodiments, a contaminant material removal process may comprise contacting the contaminant materials and/or the industrial equipment with the solvent composition. For example, in embodiments comprising a vessel containing contaminant materials disposed within, the solvent composition may be poured, pumped, injected, or using any other suitable means, into the vessel such that the solvent composition contacts the contaminant materials disposed therein. As another example, in embodiments comprising industrial equipment having contaminant materials disposed thereon, the solvent composition may be poured onto the contaminated portion of the industrial equipment or the contaminated portion of the industrial equipment may be submerged in the solvent composition such that the solvent composition contacts the contaminant materials disposed thereon. In another embodiment, the solvent composition may be circulated though the contaminated equipment in a process known as liquid circulation. In embodiments, liquid circulation may be carried out at ambient temperatures.

In optional embodiments, the contaminant material removal process may include the addition of heat to the solvent composition. The heat may be added by any suitable means such as steam, heated coils, the like, or any combinations thereof. In another embodiment, the contaminant material removal process may include a liquid boilout. In a liquid boilout, a steam stream may be introduced into the solvent composition to heat the liquid and agitate the contents. The resulting solution may be introduced into the contaminated equipment by any suitable means such as, for example, being pumped into or circulated within the contaminated equipment. A liquid boilout may result in a partially vaporized solvent composition. In further optional embodiments, the solvent composition may be heated to a temperature at or near about 212° F. for aqueous solvent. The heat may be applied to the solvent composition prior to the solvent composition contacting a contaminant material or concurrently while the solvent composition is contacting a contaminant material. Without limitation, in these optional embodiments, the heat may be added to facilitate the disaggregation, dissolution, and oxidation processes between the solvent composition and the contaminant materials.

In another embodiment, the contaminant material removal process may include a process referred to as Vapour-Phase®, which is a registered trademark of United Laboratories International, LLC. The solvent composition may be directly injected into a steam supply line connected to the contaminated vessel or equipment. In an embodiment, the solvent composition may be completely vaporized and carried with the steam as a vapor phase into equipment. To facilitate complete vaporization of the solvent composition, the concentration of the components of the solvent composition may be adjusted so the boiling point of the solvent composition matches the boiling point of the water in the steam line. Matching boiling points may allow the solvent composition to be part of the vapor when injected into steam. In conventional attempts at formulating a solvent composition for use in decontaminating industrial equipment, the boiling point of the solvent composition has not been matched as the conventional techniques have generally relied solely on steam dispersion. If the solvent composition is completely vaporized, a minimum number of injection points may be used to effectively decontaminate equipment. In some embodiments, the steam may be saturated steam. Although saturated steam is a method used, unsaturated steam may be commonly encountered in a refinery or other industrial plant due to the use of boilers to generate steam. Boilers may discharge steam with some wetness or a steam quality of less than 1. One of ordinary skill in the art would understand that both saturated and unsaturated steam may be used with the solvent composition of the present disclosure. In some embodiments, the steam may comprise a saturated or unsaturated steam from about 50 psi to about 200 psi, alternatively about 100 psi to about 150 psi. It is to be understood that lower steam pressure such as below about 50 psi to about 30 psi may be used with larger diameter pipe such as about 5 to about 8 inches to greater. It is also understood that steam pressure below about 600 psi to about 400 psi may be used if water is injected upstream. Temperature in the contaminated equipment may be maintained at a temperature sufficiently high to minimize the condensation of the steam and sufficiently low to prevent thermal degradation of components in the solvent composition. In some embodiments, the internal temperature of the process equipment may be about ambient temperature to about 400° F., alternatively between about 200° F. to about 400° F., alternatively between about 220° F. to about 400° F., alternatively about 240° F. to about 300° F., and further alternatively about 260° F. to about 280° F. The exact temperature range depends on the pressure of the steam used for the solvent composition and the components of the solvent composition.

In optional embodiments, the contaminant removal process may include the addition of agitation to the solvent composition. The agitation may be added by any suitable means such as stirring, shaking, pumping, steaming, nitrogen flow, the like, or any combinations thereof. The agitation may be applied to the solvent composition prior to the solvent composition contacting a contaminant material or concurrently while the solvent composition is contacting a contaminant material. Without limitation, in these optional embodiments, the agitation is added to facilitate the disaggregation and/or dissolution process between the solvent composition and the contaminant materials. In further optional embodiments, the solvent composition may be both agitated and heated as described above. With the benefit of this disclosure, one of ordinary skill in the art should be able to select an appropriate application method of the solvent composition along with an appropriate pressure and temperature for a chosen application.

Any suitable timeframe during which the solvent composition is in contact with the contaminant materials may be used. In embodiments, the timeframe may extend for a sufficient period whereby at least a portion of the contaminant materials are removed (i.e., disaggregated, dissolved, emulsified, neutralized, and/or oxidized). In an embodiment, the timeframe may be from about one minute to about three weeks. In alternative embodiments, the time frame may be from about one hour to about forty-eight hours. In further alternative embodiments, the time frame may be from about one hour to about twelve hours.

In embodiments, once the contaminant materials have been removed (i.e., disaggregated and/or dissolved), the contaminant materials may reside in the solvent composition and may therefore be fluid and/or flowable within the solvent composition. As previously discussed, some contaminant materials, such as metal sulfides and hydrogen sulfide, may yield solid products after treatment with the solvent composition. Solid products may be carried with the bulk liquid in a liquid circulation application or liquid boil up application and may be carried by the steam or bulk fluid in a Vapour-Phase® application. Additionally, any gas liberated during decontamination may be removed by the bulk flow of the aqueous phase or in the case of Vapour-Phase®, the gas may travel with the bulk vapor. The contaminant materials residing within the solvent composition may then be pumped, poured, or otherwise removed from the industrial equipment along with the solvent composition.

In optional embodiments, the surface that was contaminated by a contaminant material may be cleaned after the contaminant material has been contacted by the solvent composition. Without limitation, cleaning the surface may remove additional particulates and/or residue of the contaminant material. The cleaning may be accomplished by any suitable methods such as rinsing, spraying, scrubbing, scraping, acidizing, passivating, and the like. Rinsing and/or spraying may be accomplished by any suitable method including rinsing and/or spraying with water, either by itself or containing soda ash, caustic, sodium nitrite/nitrate, inhibited hydrochloric acid, citric acid, formic acid, ethylene diamine tetraacetic acid, or any combinations thereof.

In optional embodiments, the contaminant materials may be recovered and/or recycled. The process of recovery and recycle may comprise transferring the spent solvent composition comprising removed (i.e., disaggregated and/or dissolved) contaminant materials to a container or vessel. During the decontamination, the amine oxide may be converted into a water insoluble product after reaction with sulfides or other contaminants. The spent amine oxide may phase out of the aqueous solution and may be skimmed off to produce a cleaner effluent. Solids present in the spent solvent composition may be filtered or removed by any other suitable means. The aqueous phase of the spent solvent composition may be discharged to a wastewater treatment facility.

In optional embodiments, the solvent composition may be used in conjunction with other products used to treat industrial equipment for contaminant materials or otherwise unwanted materials. For example, the solvent composition may be used in conjunction with other organic solvents and/or organic solvent additives to dissolve and/or soften contaminant materials and the like. Examples include the solvent Rezyd-X®, a registered trademark of United Laboratories International, LLC; the solvent additive HOB®, a registered trademark of United Laboratories International, LLC; the solvent Rezyd-HP™, a trademark of United Laboratories International, LLC; and any other suitable asphalt and heavy hydrocarbon tank cleaners.

To facilitate a better understanding of the present embodiments, the following examples of certain aspects of some embodiments are given. In no way should the following examples be read to limit, or define, the entire scope of the embodiments.

Example 1

The following example was a comparative illustration between the solvent compositions and the impact of anti-foamers on agitated solutions. As previously discussed, amine oxides tend to foam excessively when agitated.

A foaming analysis test was prepared as shown in Table 1. Each sample contained an initial volume of 28 ml of solvent composition comprising amine oxide, water, enzyme blend, and a selected anti-foaming agent.

TABLE 1

Foaming Analysis Test

| Sample | Anti-Foaming Agent |
|---|---|
| 1 | None |
| 2 | TA |
| 3 | Polydimethylsiloxane |

Each sample was agitated for one minute and then allowed to rest. It was observed that sample 1 which contained no anti-foaming agent had approximately 100 ml of foam, sample 2 containing the TA anti-foaming agent had approximately 1 ml of foam, and sample 3 containing the polydimethylsiloxane anti-foaming agent had approximately 3 ml of foam. TA is a polydimethylsiloxane formulation by Taylor Antifoam™. Sample 3 is also a polydimethylsiloxane antifoamer by Piedmont™. Foam in the second sample was observed to collapse after 15 seconds, and foam in the third sample was observed to collapse after 30 seconds. Foam from the first sample was observed to remain stable for an extended period of time.

Example 2

An oxidative analysis was performed on samples 2 and 3 to test for oxidative ability of amine oxide in solution with an anti-foaming agent. An aliquot of each sample was placed in a test tube, and a measure of iron sulfide was added. It was observed in both samples that iron oxide precipitated out of solution, and a subsequent cloudy mixture was formed, thus verifying the oxidation of iron sulfide. A separate aliquot of each sample was added to a new test tube, and a measure of sour water comprising 1 wt. % $H_2S$ was added. The mole ratio of amine oxide to hydrogen sulfide was 1.5:1 in each test. Lead acetate paper was dipped in each tube, and it was observed that all hydrogen sulfide had been removed.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A solvent composition comprising:

one or more amine oxides, wherein each of the one or more amine oxides comprises N,N dimethyl decylamine; N,N dimethyl dodecylamine; N,N, dimethyl tetradecylamine; N,N dimethyl hexadecylamine; N,N dimethyl octadecylamine; or a combination thereof;

polydimethylsiloxane, wherein the polydimethylsiloxane acts as an anti-foaming agent; and steam, wherein the solvent composition is substantially vaporized.

2. The solvent composition of claim 1, wherein the one or more amine oxides follow formula:

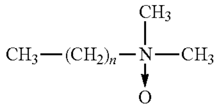

wherein the letter "n" refers to the number of —$CH_2$— groups.

3. The solvent composition of claim 1, wherein the one or more amine oxides are present in an amount of about 30 ppm to about 2,100 ppm.

4. The solvent composition of claim 1, wherein the one or more amine oxides are present in an amount of up to about 2,400 ppm.

5. The solvent composition of claim 1, wherein the polydimethylsiloxane is present in an amount of about 1 ppm to about 100 ppm.

6. The system of claim 1, wherein the solvent composition has a boiling point substantially the same as the boiling point of water.

7. The solvent composition of claim 1, further comprising an enzyme blend.

8. The solvent composition of claim 7, wherein the enzyme blend comprises a lipase, a cellulase, an amylase, a protease, a pectinase, or combinations thereof.

9. The solvent composition of claim 7, wherein the enzyme blend is present in an amount of about 1 ppm to about 100 ppm.

10. A system for decontaminating a vessel, comprising:

a solvent composition comprising one or more amine oxides, polydimethylsiloxane, and steam; and a steam line, wherein the solvent composition is introduced into the steam line, further wherein the solvent composition is employed in a single-step process to remove contaminants, in which the process of removing contaminants comprises deoiling, degassing, pyrophoric neutralization, and sulfide oxidation, which occur about simultaneously, and further wherein the solvent composition is substantially vaporized.

11. The system of claim 10, wherein the one or more amine oxides of the solvent composition follow formula:

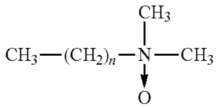

wherein the letter "n" refers to the number of —$CH_2$— groups.

12. The system of claim 10, wherein the one or more amine oxides of the solvent composition comprise 5 to 22 —$CH_2$— groups.

13. The system of claim 10, wherein the one or more amine oxides of the solvent composition are present in an amount of about 30 ppm to about 2,100 ppm.

14. The system of claim 10, wherein the one or more amine oxides of the solvent composition are present in an amount of up to about 2,400 ppm.

15. The system of claim 10, wherein the polydimethylsiloxane of the solvent composition is present in an amount of about 1 ppm to about 100 ppm.

16. The system of claim 10, wherein the steam line comprises saturated steam at a pressure of about 50 psi to about 200 psi.

17. The system of claim 10, wherein the steam line comprises unsaturated steam at a pressure of about 50 psi to about 200 psi.

18. The system of claim 10, wherein the solvent composition further comprises an enzyme blend.

19. The system of claim 18, wherein the enzyme blend comprises a lipase, a cellulase, an amylase, a protease, a pectinase, or combinations thereof.

20. The system of claim 18, wherein the enzyme blend is present in an amount of about 1 ppm to about 100 ppm.

* * * * *